United States Patent [19]

Poling

[11] Patent Number: 4,657,207

[45] Date of Patent: Apr. 14, 1987

[54] KIT FOR CONVERTING A MOTORCYCLE TO AN AIRBORNE VEHICLE

[76] Inventor: Don R. Poling, 11717 Lakeside Ave., Lakeside, Calif. 92040

[21] Appl. No.: 644,382

[22] Filed: Aug. 27, 1984

[51] Int. Cl.$^4$ ............................................. B64C 37/00
[52] U.S. Cl. ................................ 244/2; 244/DIG. 14; 244/13; 280/213; 180/7.4
[58] Field of Search ................ 244/142, 145, 138 R, 244/DIG. 1, 13, 64, 62, 2; 440/12; 180/7.4, 271; 280/212, 213, 1.2

[56] References Cited

U.S. PATENT DOCUMENTS

| | | | |
|---|---|---|---|
| 1,564,534 | 8/1924 | Ziperstein | 244/64 |
| 1,568,095 | 1/1926 | Silver | 244/64 |
| 1,789,623 | 1/1931 | Franz | 244/62 |
| 4,050,399 | 9/1977 | Mochel | 440/12 |
| 4,068,810 | 1/1978 | Malewicki | 244/2 |
| 4,424,945 | 1/1984 | Dell | 244/142 |

OTHER PUBLICATIONS

John D. Nicolaides, "Parafoil Powered Flight Performance", Jan. 1972.

Primary Examiner—Galen Barefoot
Assistant Examiner—Lynn M. Fiorito
Attorney, Agent, or Firm—Baker, Maxham & Jester

[57] ABSTRACT

A kit for converting a motorcycle to an aircraft or airborne vehicle includes a glider type parachute with fore and aft lines for connecting to and supporting a motorcycle, in a balanced position, with a propeller system including counter rotating propellers mounted on a pair of concentric shafts and driven by rollers drivingly engaging the rear drive wheel of the motorcycle. Directional control by means of control lines attached to the rear of teeter bars suspended below the wing and connected by directional control lines to outriggers attached to the front wheel structure of the motorcycle.

13 Claims, 6 Drawing Figures

KIT FOR CONVERTING A MOTORCYCLE TO AN AIRBORNE VEHICLE

BACKGROUND OF THE INVENTION

The present invention relates to aircraft and pertains particularly to a conversion system for converting a ground engaging motorcycle to an airborne vehicle.

Both ground based vehicles and airborne vehicles are well known in the art. There have been in the past many attempts to devise a suitable vehicle for both ground travel and air travel. Such vehicles have not been entirely satisfactory and have not gained wide spread acceptance.

Most prior art approaches to the combined ground base and air vehicles had attempted to provide folding type of wing structures for the typical passenger automobile. The power-to-weight ratio of passenger vehicles have in the past tended to make this approach largely impractical.

The recent development of the gliding or para-wing parachute and the powered hang gliders commonly referred to as ultra light aircraft has led to proposals for utilizing the para glider type wing structure for ultra light aircraft. One such approach as exemplified in U.S. Pat. No. 3,140,842 entitled "Flexible Wing Aircraft", issued July 14, 1964 to Craigo et al, utilizes a propeller driven go cart type like vehicle suspended from a hang glider type wing structure. This approach, however, provides primarily an ultra light type aircraft and not a combined manned vehicle and aircraft.

I have developed an improved combined land based vehicle and airborne vehicle.

SUMMARY AND OBJECTS OF THE INVENTION

It is the primary object of the present invention to provide an improved combined land based vehicle and airborne vehicle.

In accordance with the primary aspect of the present invention, an adaptor system for converting a vehicle such as a motorcycle to an airborne vehicle includes a power system including a pusher propeller with means for attachment directly over the rear driving wheels of the motorcycle and for drivingly connecting a propeller thereto. Wing structure in the form of a pliable fabric gliding parachute is connected by support lines to the front and rear of the motorcycle in a balanced configuration with directional control lines connected to teeter bars disposed below the parachute wing and connected to the steering assembly of the motorcycle for directional control of the airborne vehicle.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
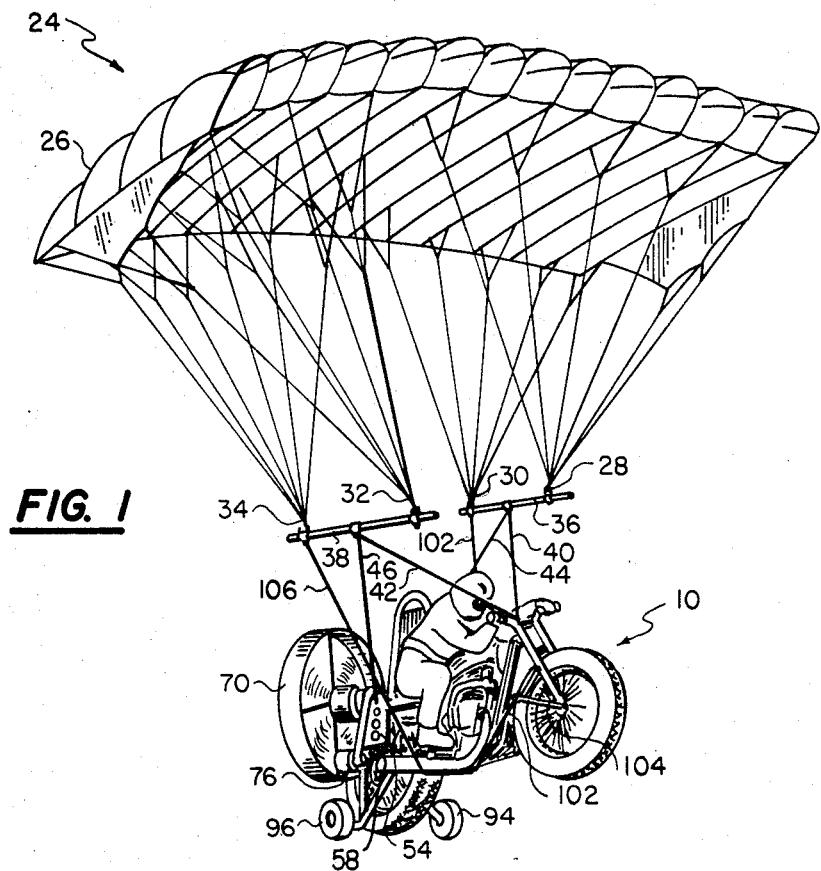
FIG. 1 is a perspective view of the vehicle in accordance with the invention shown in flight.
Figure 2:
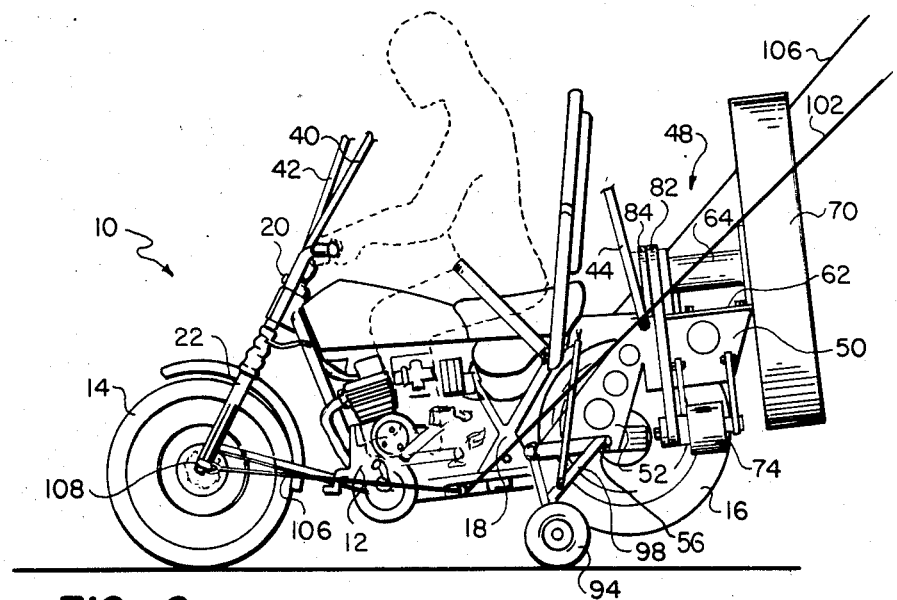
FIG. 2 is a side elevation view of the vehicle of FIG. 1.

Referring alternately to FIGS. 1 and 2 of the drawing, there is illustrated an embodiment of the invention which converts a typical two wheeled motorcycle to an airborne vehicle. The contemplated system in accordance with the preferred embodiment comprises an attachment for a typical two wheeled motorcycle designated generally by the numeral 10 is powered by an adequate sized engine 12 which is mounted between a front wheel 14 and, a rear wheel 16 in the center of the frame assembly 18 and drivingly connected to the rear wheel 16 of the motorcycle for driving the rear wheels. The typical motorcycle includes handlebars 20 connected by or through a suspension fork assembly 22 to the front wheels of the vehicle for directional control of the vehicle with controls for brakes, throttle and the like being mounted on the handlebars for control by the operator thereof.

As shown in FIG. 1, a motorcycle 10 of general conventional construction, size and power, etc. is suspended by means of a suitable suspension system comprising a plurality of lines from a glider type parachute designated generally by the numeral 24. The parachute 24 has a canopy 26 of a generally aircraft wing configuration and is designed to provide a considerable amount of forward or lateral movement for or in relation to the vertical movement thereof. Such parachutes have been developed and are capable of functioning like wings for gliding great distances over a given vertical range of descent. Steering of the parachute is accomplished by pulling lines which comprise control lines detached to the rear edges and outer ends of the parachute for causing or deflecting the wing of the chute downward for increasing the drag on a particular side. This steers the craft in the direction of the deflected wing. Reference is made to U.S. Pat. No. 4,399,969 issued Aug. 23, 1983 to Gargano, which is incorporated herein by reference, for details of construction and rigging of such chutes.

The suspension and control system for the chute as shown in FIG. 1 comprises a plurality of groups of lines 28, 30, 32 and 34 attached at various positions to the canopy in a substantially conventional configuration and attached at common points to a pair of longitudinally directed bars 36 and 38 at each side of the wing which are herein referred to as teeter bars. Control of the chute may be accomplished by tilting these bars and as will be explained. The forcing of the rear end of either of the bars forces the parachute to steer in the particular direction by pulling down the rear corner or tip of the canopy causing it to drag.

The motorcycle of the present invention is suspended from approximate the center of the teeter bars 36 and 38 by suspension straps or lines which are attached in pairs respectively defined as fore lines or straps 40 and 42 to the front end of the vehicle preferably attached by detachable parachute clamps or the like to the center portion of the handlebars 20 or the like. Aft support lines or straps 44 and 46 are similarly attached by clamp means to the frame of the vehicle at a position behind the operator such that the vehicle is substantially balanced in the chute. The teeter bars 36 and 38 are preferably high strength light weight tubing such as aluminum or the like. The control and support lines may be made of any suitable light weight, high strength material such as that sold under the trademarks DACREN or KEVLAR. The lines 40–46 may be constructed in the form of webbed straps.

A power unit designated generally by the numeral 48 (FIG. 2) for powering the vehicle in the aircraft or airframe configuration comprises a frame structure 50 having a pair of downwardly depending legs 52 and 54 that are adapted to be attached to the lower rear frame of the motorcycle and includes slits or forks (not shown) at the lower ends thereof for attachment, for example to the rear axle 60 of the vehicle. Bolts, clamps or the like may be utilized for attaching the frame structure directly to the frame of the motorcycle.

The frame structure includes a generally horizontal table or support surface 62 on which is mounted a propeller support assembly, comprising a propeller support block or head 64 having a pair of concentrically mounted propeller shafts therein of a generally conventional arrangement (not shown). The shafts extend from both ends of the support head 64 and generally parallel to the longitudinal axis of the vehicle when in the aircraft mode. A pair of counter rotating propellers 66 and 68 (FIG. 4) are mounted on the counter rotating shafts such that the propellers may rotate in opposite directions. A circular shroud 70 with support arms or the like 72 is attached to cover the propeller 66 and 68 to prevent accidental engagement or entanglement with the propeller.

Figure 3:
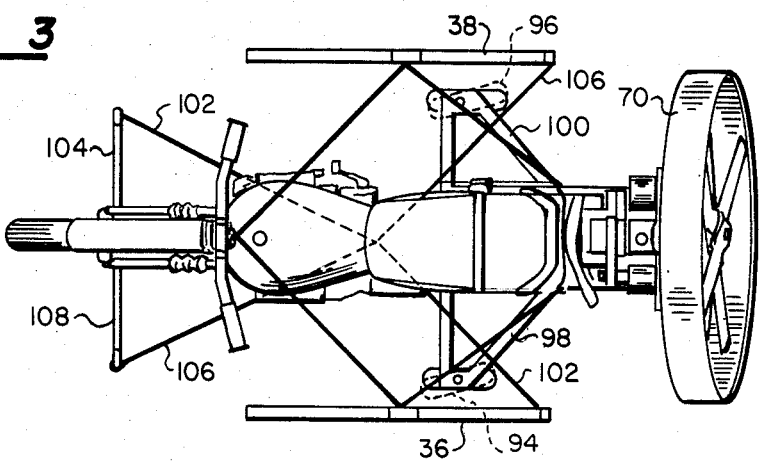
FIG. 3 is a top plan view of the vehicle of FIG. 1.
Figure 4:
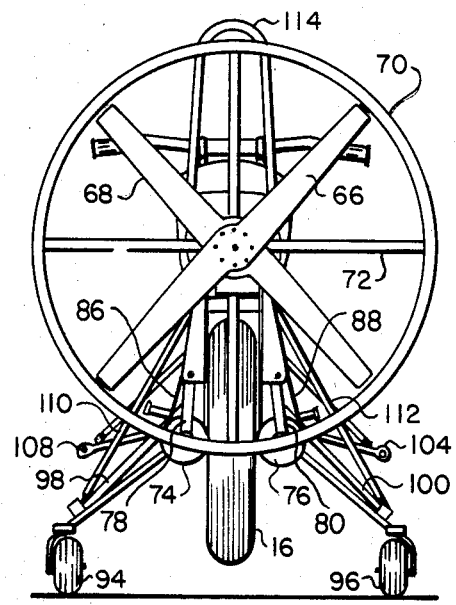
FIG. 4 is a rear view of the vehicle of FIG. 1.

The drive or power from the engine of the motorcycle to the propellers is accomplished by a transmission system which transmits the power by way of a pair of rollers 74 and 76 (FIGS. 2, 3 and 4) on each side of the rear or driving wheel 16 which are supportedly mounted on pivoting arms 78 and 80 (FIG. 4). The pivoting arms 78 and 80 are attached to the support frame structure 50 (FIGS. 2, 4) and are adapted to pivot upward (FIG. 6) to pull the rollers 74 and 76 out of engagement with the drive wheels. A pair of pulleys 82 and 84 are mounted one on the end of each of the counter rotating shafts and are drivingly connected by belts 86 and 88 to the drive wheel engaging rollers 74 and 76. This transmits the power from both sides of the driving wheel 16 uniformly through a counter rotating system or transmission system to the pair of counter rotating propellers. This balances the power of the system and balances the torque load.

Figure 5:
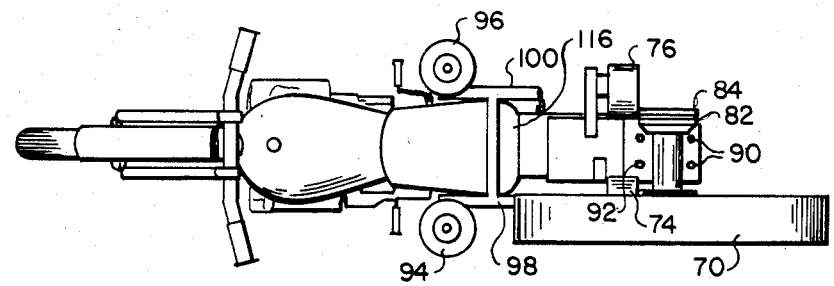
FIG. 5 is a top plan view of the embodiment of FIG. 1 showing the propeller in the non-propelling position.

When the vehicle is in the street mode (FIGS. 5 and 6), the propellers may be shifted to the side such that they lie in a plane to one side of the chassis of the motorcycle generally in a plane parallel to the longitudinal axis of the motorcycle. This is easily accomplished by the loosening of clamping bolts 90 (FIG. 5) which attach the propeller support pedestal 64 to the support table of the frame and pivoting the pedestal 64 about a bolt or the like 92 (FIG. 5). When the propeller is in the street position, the bolts 90 are again clamped or tightened down for retaining the propeller in the street position.

The drive rollers 74 and 76 are retracted from the drive wheel and a flexibility of the belts 86 and 88 enable the propellers to be easily positioned in the street position. The drive belts 86 and 88 may be arranged to remain on the pulleys 82 and 84 or may be removed as desired.

Figure 6:
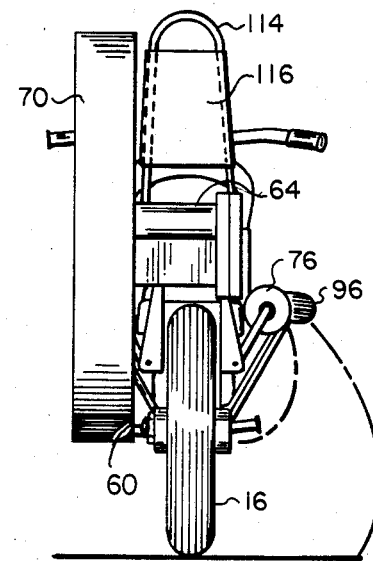
FIG. 6 is an end view of vehicle with the power unit as shown in FIG. 5.

A landing gear assembly is preferably provided for the motorcycle to enable landing independent of the drive wheel. This landing gear assembly comprises a pair of wheels 94 and 96 (FIGS. 1 and 2) that are positioned on a landing gear strut assembly 98 and 100, one extending to each side of the vehicle approximately in line with the rear wheel and for positioning below the rear wheel for supporting the vehicle with the rear wheel raised out of driving engagement with the ground (FIGS. 5 and 6). This enables the vehicle to be supported for taking off and landing solely on the landing gear while propelled solely by the thrust of the propellers.

The main gear members 98 and 100 are of a generally wishbone configuration and are pivotally attached to the base or bottom edge of the power assembly legs 52 and 54. A pair of compression links or struts 110 and 112 are connected at a lower end to the lower strut members 98 and 100 and at an upper end to a suitable bracket on the motorcycle frame. These struts are preferably spring extensible like typical aircraft struts. The struts are preferably attached by high strength quick release pins to enable quick raising and lowering of the landing gear.

The directional control of the aircraft is accomplished by control lines, one of which 102 (FIGS. 1, 2) is attached at one end to the rear end of the teeter bar 36 extending downward through a system of pulleys just behind the operator and beneath the frame and across to an outrigger or control arm 104 that is attached to and extends outward from the front forks of the vehicle (FIGS. 1 and 3). A similar control line 106 is attached to the other side of the parachute assembly to the rear end of opposite teeter bar 38 extending down beside the operator beneath the motorcycle frame and across to a like control arm or an outrigger 108 on the other side of the front forks. Thus when the operator steers the handlebars of the motorcycle in a normal manner, it pulls the control lines which pulls the teeter bars down at the rear, thus pulling down the rear edge and corner of the parachute wing forcing drag on that side of the wing, thus forcing the airborne vehicle to steer in that direction. The control lines or cables are preferably flexible steel cables encased within a sheath or tube.

While the present invention has been illustrated with regard to a motorcycle of the two wheel type, it is understood that the device with appropriate modification may be attachable and operable with three wheel motorcycles and the like. The motorcycle is a convenient vehicle for such a system as described herein because of its high power to weight ratio.

In the normal operation for street use, the drive rollers and landing gear are folded up to the side of the vehicle (FIGS. 5 and 6). Preferably the directional control outriggers 104 and 108 from the front forks are likewise folded up to the side of the vehicle. The propulsion props are positioned to the side of the vehicle as illustrated in FIGS. 5 and 6 of the drawings. The canopy and lines are preferably folded and stowed in a bag 116 attached to the upright bars 114 behind the seat.

Upon preparing the vehicle from street mode (FIGS. 5 and 6) for flight, the chute which is preferably packed in a bag or container attached to the back rest or so called sissy bars of the motorcycle is removed and attached to the vehicle. The landing gear is lowered and secured in place with the struts 110 and 112 secured in place. The propulsion system then made ready by rotating the propellers to the proper orientation (FIGS. 1–4) and making sure the drive belts are properly attached and the driving rollers 74 and 76 lowered to driving engagement with the driving wheel 16 of the motorcycle.

With all control and support lines of the parachute in place, the parachute is positioned behind the vehicle. The vehicle is lined up with a suitable runway or the like and the engine started. Once the engine is started and the propellers engaged and driven which are driven through the normal transmission of the motorcycle, the air pushed by the propellers will fill the chute causing it to fill and rise above the vehicle. Once the vehicle goes into motion, the chute rises above the vehicle creating a lift for lifting the vehicle into the air. Once the vehicle is airborne, climbing is achieved by adding power through the throttle, i.e. increasing power, and descent is achieved by reducing power. Steering is achieved by simply turning the handlebars 20 of the vehicle in the conventional manner. This as is previously explained, creates drag on the side of the chute in the direction of turn causing the aircraft to turn in that direction.

While I have illustrated and described my invention by means of specific embodiments, it is to be understood that numerous changes and modifications may be made therein without departing from the spirit and scope of the invention as defined in the appended claims.

Landing of the vehicle is carried out much the same as any other aircraft into the wind. The main gear wheels 94 and 96 are preferably castered to accommodate cross wind landings when necessary. The wheels 94 and 96 are permitted to swivel as shown in phantom in FIG. 3.

I claim:

1. An aircraft conversion system for converting a motorcycle having a rear driving wheel to an aircraft, said system comprising:
    pusher propeller means comprising first and second coaxially mounted propellers, first and second concentrically mounted rotatable shafts drivingly supporting said propellers, and frame means comprising platform means on which said pusher propeller means is mounted and parallel arm means extending downward from said platform means on opposite sides of the driving wheel for mounting to the frame of a motorcycle directly over the driving wheel thereof;
    drive train means mounted on said frame means for drivingly connecting the pusher propeller to the drive wheel of said motorcycle, said drive train means comprises first and second rollers mounted on arm means of said frame means, one roller on each side of the drive wheel for pivoting into a position drivingly coupled to the drive wheel of said motorcycle, and a belt drivingly connecting each of said rollers to a respective one of said rotatable shafts;
    a para wing type gliding parachute having support lines connected thereto for attachment to fore and aft positions on the frame of said motorcycle for balanced support thereof; and
    control means including control line means connected to each side of said wing for attachment to steering means of said motorcycle for in flight steering of said parachute.

2. The system of claim 1 wherein:
    said parachute is constructed of pliable sheet material and has a generally wing shaped canopy; and
    said supporting lines include a pair of fore support lines for connecting to the front of a motorcycle and a pair of aft support lines for connecting to the rear of a motorcycle.

3. The system of claim 2 comprising:
    a pair of teeter bars connected along the length thereof by a plurality of lines to opposite side portions of said canopy; and
    said supporting lines are connected to the center of said teeter bar.

4. The system of claim 3 wherein said control line means are connected at one end to the aft end of said teeter bar.

5. The system according to claim 1 comprising:
    a landing gear assembly for attachment to the rear of the frame of a motorcycle for supporting the motorbike independently of the drive wheels thereof.

6. An aircraft conversion system for converting a motorcycle having a rear driving wheel to an aircraft, said system comprising:
    pusher propeller means including frame means comprising platform means on which said pusher propeller means is mounted and parallel arm means extending downward from said platform means on opposite sides of the drive wheel for mounting to the frame of a motorcycle directly over the drive wheel thereof;
    drive train means mounted on said frame means for drivingly connecting the pusher propeller to the drive wheel of said motorcycle;
    a landing assembly for attachment to the rear of said motorcycle for supporting the motorcycle independently of the drive wheel thereof;
    a para wing type gliding parachute having support lines connected thereto for attachment to fore and aft positions on the frame of said motorcycle for balanced support thereof; and
    control means including control line means connected at one end to each side of said parachute, and a pair of directional control arms for attachment to the front forks of said motorcycle for attachment of the other end of said control line means for use thereof for in flight steering of said parachute.

7. An aircraft conversion system for converting a motorcycle having a rear driving wheel to an aircraft, said system comprising:
    pusher propeller means including frame means having platform means on which said pusher propeller means is mounted and parallel arm means extending downward from said platform means on opposite sides of the drive wheel for mounting to the frame of a motorcycle directly over the driving wheel thereof, said propeller is pivotally mounted on said frame means for selective positioning in an operative position for providing a thrust along an axis parallel to the longitudinal axis of the motorcycle on which it is mounted and for positioning in an inoperative position in a plane parallel to the longitudinal axis of said motorcycle;
    drive train means mounted on said frame means for drivingly connecting the pusher propeller to the drive wheel of said motorcycle;
    a para wing type gliding parachute having support lines connected thereto for attachment to fore and aft positions on the frame of said motorcycle for balanced support thereof; and
    control means including control line means connected to each side of said wing for attachment to steering means of said motorcycle for use thereof for in flight steering of said parachute.

8. An aircraft conversion system for converting a two wheeled motorcycle having a rear driving wheel to an aircraft, said system comprising:

frame means comprising platform means having parallel arm means extending downward from said platform means for mounting on the frame of a motorcycle directly over the drive wheel thereof, pusher propeller means mounted on said frame means directly over said drive wheel for selective orientation to operative and inoperative positions, said propeller means comprises first and second coaxially mounted propellers and first and second concentrically mounted rotatable shafts drivingly supporting said propellers;

a para wing type gliding parachute having support lines connected thereto for attachment to fore and aft positions on the frame of a motorcycle for balanced support thereof;

control means including control line means connected to each side of said wing for attachment to steering means of said motorcycle for in flight steering of said parachute; and drive train means for drivingly connecting the pusher propeller to the drive wheel of said motorcycle, comprising first and second pivoting arms on said frame means, first and second rollers, each mounted on one of said arms, one to each side of said drive wheel for driving engagement with the drive wheel of said motorcycle, and a belt drivingly connected each of said rollers to a respective one of said rotatable shafts.

9. The system of claim 8 wherein:

said parachute is constructed of pliable sheet material and has a generally wing shaped canopy; and said supporting lines includes a pair of fore support lines for connecting to the front of a motorcycle and a pair of aft support lines for connecting to the rear of a motorcycle.

10. The system of claim 9 comprising:

a pair of teeter bars connected along the length thereof by a plurality of lines to opposite side portions of said canopy;

said supporting lines are connected to the center of said teeter bar;

said control line means are connected at one end to the aft end of said teeter bar; and a pair of directional control arms for attachment to the front forks of a motorcycle for attachment of said other end of said control line means.

11. The system according to claim 10 comprising:

landing gear comprising a pair of wheels, each mounted on a retractable strut on said frame means on opposite sides of said frame and extendable to a position below the drive wheel of the motorcycle for supporting the motorcycle independently of the drive wheels thereof.

12. The system of claim 11 wherein said propeller is pivotally mounted on said frame means for selective positioning in an operative position for providing a thrust along an axis parallel to the longitudinal axis of a motorcycle on which it is mounted and for positioning in an inoperative position in a plane parallel to the longitudinal axis of said motorcycle.

13. A combination of a land vehicle and an aircraft, said combination comprising:

a two wheel motorcycle of the type having a rear drive wheel;

frame means comprising a platform and parallel arms extending downward from said platform on each side of said driving wheel for mounting on the frame of the motorcycle with the platform means directly over the drive wheel thereof;

pusher propeller means mounted on said frame means over the driving wheel thereof for selective orientation to operative and inoperative positions and including first and second concentrically mounted rotatable shafts supporting first and second counter rotating propellers;

drive train means comprising first and second drive rollers pivotally mounted on said frame means for driving engagement with said drive wheel, and a belt drivingly connecting each roller to one of said rotatable shafts for drivingly connecting the pusher propeller to the drive wheel;

a para wing type gliding parachute having a generally wing shaped canopy, a pair of teeter bars connected to opposite sides of said canopy by a plurality of support lines, and support lines connected thereto for attachment to fore and aft positions on the frame of said motorcycle for balanced support thereof;

control means including control line means connected to the aft end of each of said teeter bars and to steering means of said motorcycle for in flight steering of said aircraft; and landing gear comprising a pair of wheels, each mounted on a retractable strut on said frame means on opposite sides of said frame and extendable to a position below the drive wheel of the motorcycle for supporting the motorcycle independently of the drive wheels thereof.

* * * * *